US012811416B2

(12) United States Patent
Wang

(10) Patent No.: US 12,811,416 B2
(45) Date of Patent: Nov. 24, 2026

(54) SWITCHING DEVICE FOR CHARGING EQUIPMENT

(71) Applicant: TOSHIBA MITSUBISHI-ELECTRIC INDUSTRIAL SYSTEMS CORPORATION, Tokyo (JP)

(72) Inventor: Xiangguo Wang, Tokyo (JP)

(73) Assignee: TMEIC CORPORATION, Tokyo (JP)

( * ) Notice: Subject to any disclaimer, the term of this patent is extended or adjusted under 35 U.S.C. 154(b) by 465 days.

(21) Appl. No.: 18/555,545

(22) PCT Filed: Feb. 25, 2022

(86) PCT No.: PCT/JP2022/007839

§ 371 (c)(1),
(2) Date: Oct. 16, 2023

(87) PCT Pub. No.: WO2023/162123

PCT Pub. Date: Aug. 31, 2023

(65) Prior Publication Data

US 2024/0204542 A1 Jun. 20, 2024

(51) Int. Cl.

*H02J 7/56* (2026.01)
*B60L 53/14* (2019.01)
*B60L 53/30* (2019.01)
*H02J 105/37* (2026.01)

(52) U.S. Cl.

CPC ................ *H02J 7/56* (2026.01); *B60L 53/14* (2019.02); *B60L 53/305* (2019.02); *H02J 2105/37* (2026.01)

(58) Field of Classification Search

CPC .................................. H02J 7/50; B60L 53/30
USPC ........................................................ 320/109
See application file for complete search history.

(56) References Cited

FOREIGN PATENT DOCUMENTS

| | | | |
|---|---|---|---|
| CN | 107650730 | A | 2/2018 |
| CN | 111497675 | A | 8/2020 |
| JP | 2015-082867 | A | 4/2015 |
| JP | 2019-213424 | A | 12/2019 |
| WO | 2011/145939 | A2 | 11/2011 |

OTHER PUBLICATIONS

International Search Report and Written Opinion mailed on Apr. 19, 2022, received for PCT Application PCT/JP2022/007839, filed on Feb. 25, 2022, 8 pages including English Translation.

Office Action issued on Jun. 24, 2026, in corresponding Indian patent Application No. 202317068443, 7 pages.

Office Action issued on Sep. 3, 2026, in corresponding Chinese patent Application No. 202280027810.9, 14 pages.

*Primary Examiner* — Ahmed H Omar
(74) *Attorney, Agent, or Firm* — XSENSUS LLP

(57) ABSTRACT

A switching device for charging equipment includes a controller that controls the switching of the connections by a switching part, the switching part includes a plurality of first switching elements provided to correspond respectively to the plurality of power supplies; and a plurality of second switching elements located between each of the plurality of first switching elements and each of the plurality of charging stations, the plurality of second switching elements allow direct current power supplied from the plurality of power supplies to be selectively supplied via the plurality of first switching elements to each of the plurality of charging stations, the controller controls the switching of the connections by the switching part by controlling switching of each of the plurality of first switching elements and the plurality of second switching elements.

3 Claims, 2 Drawing Sheets

SWITCHING DEVICE FOR CHARGING EQUIPMENT

CROSS-REFERENCE TO RELATED APPLICATION

The present application is based on PCT filing PCT/JP2022/007839, filed Feb. 25, 2022, the entire contents of which are incorporated herein by reference.

FIELD

Embodiments described herein relate generally to a switching device for charging equipment.

BACKGROUND ART

Multi-output quick chargers are being introduced to charging equipment that charges power storage devices mounted in electric vehicles. Multi-output charging equipment includes multiple power supplies for supplying DC power corresponding to the electric vehicles, multiple charging stations for connecting to the electric vehicles, and switching devices selectively switching the connections between the multiple power supplies and the multiple charging stations. The utilization efficiency of such multi-output charging equipment can be increased because the equipment is capable of power sharing of the output of one power supply by multiple charging stations.

The switching device includes multiple switching elements and selectively switches the output destinations of the multiple power supplies by switching the multiple switching elements. The multiple switching elements of the switching device must withstand the rated outputs of the power supplies. It is therefore necessary to use components that can withstand high voltages/large currents in the multiple switching elements.

It is necessary for the number of multiple switching elements to be the number of charging stations multiplied by the number of power supplies. However, a switching element that can withstand high voltages/large currents is expensive compared to a low-voltage switching element, etc.; and selecting each of the multiple switching elements to be a switching element that can withstand high voltages/large currents is one cause of higher equipment costs of charging equipment.

Also, to increase the convenience of electric vehicles, higher-capacity and higher-voltage power storage devices are being mounted in electric vehicles, and accordingly, higher-output charging equipment also is being pursued. Furthermore, charging station numbers also have an increasing trend. The number and breakdown voltage performance of the switching elements in the switching devices are therefore expected to continue to steadily increase, and there is a risk that the equipment costs of charging equipment will be increased thereby.

It is therefore desirable for switching devices used in charging equipment to be able to appropriately switch the output destinations while suppressing an equipment cost increase.

PRIOR ART DOCUMENTS

Patent Documents

[Patent Document 1] JP-A-2015-82867

SUMMARY OF INVENTION

Technical Problem

Embodiments of the invention provide a switching device for charging equipment that appropriately switches output destinations while suppressing an equipment cost increase.

Solution to Problem

A switching device for charging equipment provided according to an embodiment of the invention includes a switching part, and a controller, the switching device is used in the charging equipment, the charging equipment includes a plurality of power supplies configured to supply direct current power corresponding to electric vehicles; and a plurality of charging stations used to connect with the electric vehicles, the switching device selectively switches connections between each of the plurality of power supplies and each of the plurality of charging stations, the switching part switches the connections between each of the plurality of power supplies and each of the plurality of charging stations; the controller controls the switching of the connections by the switching part, the switching part includes a plurality of first switching elements provided to correspond respectively to the plurality of power supplies; and a plurality of second switching elements located between each of the plurality of first switching elements and each of the plurality of charging stations, the plurality of second switching elements allow direct current power supplied from the plurality of power supplies to be selectively supplied via the plurality of first switching elements to each of the plurality of charging stations, rated voltages of the plurality of first switching elements are respectively not less than rated voltages of corresponding power supplies among the plurality of power supplies, rated currents of the plurality of first switching elements are respectively not less than rated currents of the corresponding power supplies, rated voltages of the plurality of second switching elements are less than the rated voltages of the plurality of first switching elements, rated currents of the plurality of second switching elements are not less than the rated currents of the corresponding power supplies, the controller controls the switching of the connections by the switching part by controlling switching of each of the plurality of first switching elements and the plurality of second switching elements, so that when supplying power from a designated power supply among the plurality of power supplies to a designated charging station among the plurality of charging stations, the first switching element located between the designated power supply and the designated charging station is switched from an open state to an engaged state after the second switching element located between the designated power supply and the designated charging station is switched from an open state to an engaged state.

Advantageous Effects of Invention

According to embodiments of the invention, a switching device for charging equipment is provided that appropriately switches output destinations while suppressing an equipment cost increase.

Figure 1:
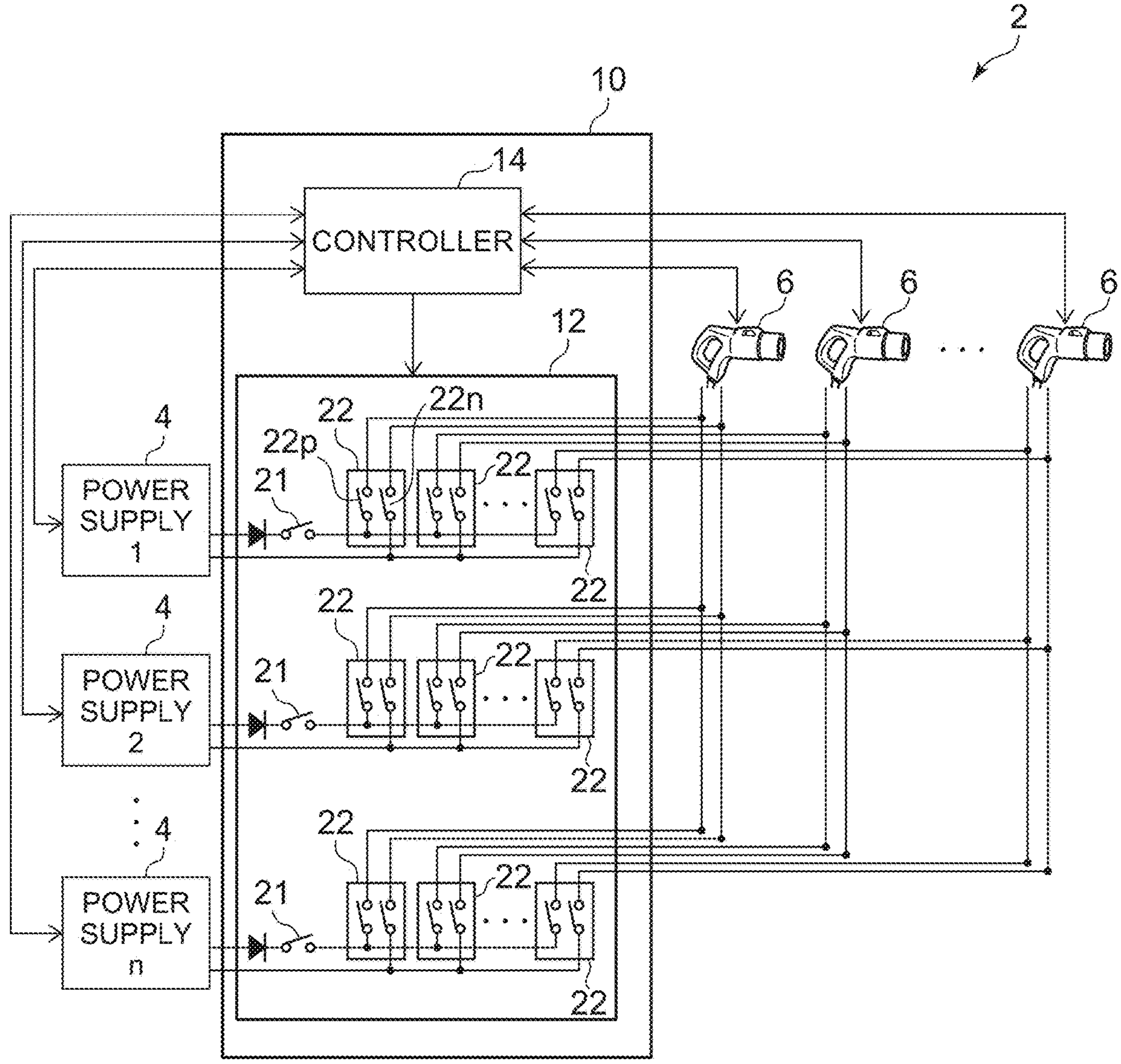
FIG. 1 is a block diagram schematically illustrating charging equipment according to an embodiment.

Embodiments will now be described with reference to the drawings.

The drawings are schematic and conceptual; and the relationships between the thicknesses and widths of portions, the proportions of sizes among portions, etc., are not necessarily the same as the actual values. Also, the dimensions and proportions may be illustrated differently among drawings, even for identical portions.

In the specification and drawings, components similar to those described previously or illustrated in an antecedent drawing are marked with the same reference numerals; and a detailed description is omitted as appropriate.

FIG. 1 is a block diagram schematically illustrating charging equipment according to an embodiment.

As illustrated in FIG. 1, the charging equipment 2 includes multiple power supplies 4, multiple charging stations 6, and a switching device 10.

The multiple power supplies 4 are power supplies for supplying DC power corresponding to electric vehicles. More specifically, the multiple power supplies 4 supply DC power corresponding to power storage devices mounted in electric vehicles. The power storage devices of the electric vehicles are, for example, storage batteries, capacitors, etc. The power storage devices may be any device capable of storing DC power.

The multiple power supplies 4 are, for example, AC/DC converters. For example, the multiple power supplies 4 are connected to a power system of alternating current, convert the AC power supplied from the power system into DC power corresponding to power storage devices of electric vehicles, and supply the DC power after the conversion to the electric vehicles. The multiple power supplies 4 may be, for example, DC/DC converters, etc. The multiple power supplies 4 may be configured so that, for example, the multiple power supplies 4 are connected to a power system of alternating current via a common AC/DC converter, convert DC power supplied from the AC/DC converter into other DC power corresponding to the power storage devices of the electric vehicles, supply the DC power after the conversion to the electric vehicles, etc.

The rated voltages of the multiple power supplies 4 are, for example, not less than the total voltage of the power storage device of the electric vehicle. The total voltage of the power storage device of the electric vehicle is, for example, about 400 V. In such a case, the rated voltages of the multiple power supplies 4 are set to be not less than 400 V. The rated voltages of the multiple power supplies 4 may not always be the same. The configurations of the multiple power supplies 4 are not limited to those described above and may be any configuration that can supply DC power corresponding to the power storage device of the electric vehicle to appropriately charge the power storage device of the electric vehicle.

The multiple charging stations 6 are used to connect to electric vehicles. The charging equipment 2 is connected with an electric vehicle via one of the multiple charging stations 6. Accordingly, in the charging equipment 2, the number of electric vehicles that can be charged corresponds to the number of the charging stations 6. In other words, the charging station 6 is a charging plug that is detachably connected to a charging socket provided in the electric vehicle. The number of the charging stations 6 may be the same as or different from the number of the power supplies 4. The number of the power supplies 4 and the number of the charging stations 6 may be any number.

The switching device 10 selectively switches the connections between each of the multiple power supplies 4 and each of the multiple charging stations 6. In other words, the switching device 10 makes it possible for the outputs of the multiple power supplies 4 to be selectively supplied to the multiple charging stations 6.

Accordingly, the charging equipment 2 makes power sharing possible, in which the output of one power supply 4 is distributed to multiple charging stations 6 to simultaneously charge multiple electric vehicles. Also, in the charging equipment 2, when an electric vehicle is connected to any charging station 6 among the multiple charging stations 6, the outputs of the multiple power supplies 4 each can be supplied to the charging station 6 connected with the electric vehicle; and the utilization efficiency of the multiple power supplies 4 can be increased.

The switching device 10 includes a switching part 12 and a controller 14. The switching part 12 switches the connections between each of the multiple power supplies 4 and each of the multiple charging stations 6. The controller 14 controls the switching of the connections by the switching part 12.

The controller 14 is connected with the multiple power supplies 4 and the multiple charging stations 6 and communicates with the multiple power supplies 4 and the multiple charging stations 6. The controller 14 communicates via the multiple charging stations 6 with the electric vehicles connected to the charging stations 6 and receives the command values of the charge current from the electric vehicles. The controller 14 transmits command values to some or all of the multiple power supplies 4 to output direct currents corresponding to the received command values, and controls the switching of the connections by the switching part 12 so that the direct currents output from some or all of the multiple power supplies 4 are supplied to the corresponding electric vehicles. Accordingly, the direct currents that correspond to the command values from the electric vehicles are supplied to the corresponding electric vehicles; and the power storage devices of the electric vehicles are charged with the desired charge currents.

The configuration of the controller 14 is not limited to that described above. The controller 14 may not always communicate with the multiple power supplies 4 and the multiple charging stations 6. For example, the controller 14 may communicate with a higher-level control device and may control the switching of the connections by the switching part 12 based on an instruction from the higher-level control device.

The charging equipment 2 also may include, for example, a control device that comprehensively controls the operations of the multiple power supplies 4, the multiple charging stations 6, and the switching device 10. In other words, the control device may receive the command values from the electric vehicles and transmit the command values to the multiple power supplies 4. Also, for example, the controller 14 of the switching device 10 may be located in a higher-level control device. In other words, the controller 14 may be in an embedded configuration with a higher-level control device. The configuration of the controller 14 may be any configuration that can control at least the switching of the connections by the switching part 12.

The switching part 12 includes multiple first switching elements 21 and multiple second switching elements 22. The controller 14 controls the switching of the connections by the switching part 12 by controlling the switching of each of the multiple first switching elements 21 and the multiple second switching elements 22.

The multiple first switching elements 21 are provided to correspond respectively to the multiple power supplies 4. The multiple first switching elements 21 are connected respectively to the direct current output terminals of the multiple power supplies 4. Accordingly, the number of the multiple first switching elements 21 is equal to the number of the multiple power supplies 4.

The rated voltages of the multiple first switching elements 21 are not less than the rated voltages of the corresponding power supplies 4 among the multiple power supplies 4. The rated currents of the multiple first switching elements 21 are not less than the rated currents of the corresponding power supplies 4 among the multiple power supplies 4. The multiple first switching elements 21 are, for example, high-voltage/large-current contactors. However, the multiple first switching elements 21 are not limited to contactors and may be any switching element that can withstand the high voltages/large currents of the corresponding power supplies 4.

The rated voltage of the power supply 4 is, more specifically, the maximum voltage that can be output in the normal operation of the power supply 4. The rated current of the power supply 4 is, more specifically, the maximum current that can be output in the normal operation of the power supply 4. The rated voltage of the first switching element 21 is, more specifically, a voltage at which the first switching element 21 can appropriately perform an ON-OFF operation and is a voltage value that is not less than the maximum voltage of the circuit-applied voltage. The rated current of the first switching element 21 is, more specifically, a current at which the first switching element 21 can appropriately operate and is a current value that is not less than the maximum conduction current.

The multiple second switching elements 22 are located between each of the multiple first switching elements 21 and each of the multiple charging stations 6 and can selectively supply the DC power supplied from the multiple power supplies 4 via the multiple first switching elements 21 to each of the multiple charging stations 6.

When the number of the multiple charging stations 6 is taken as N, N second switching elements 22 are provided between one first switching element 21 and the multiple charging stations 6. Accordingly, the DC power that is supplied from one power supply 4 via one first switching element 21 can be selectively supplied to each of the multiple charging stations 6 by switching between the engaged state (the on-state) and the open state (the off-state) of each of the N second switching elements 22.

Accordingly, the number of the multiple second switching elements 22 is the number of the multiple first switching elements 21 multiplied by the number of the multiple charging stations 6. In other words, the number of the multiple second switching elements 22 is the number of the multiple power supplies 4 multiplied by the number of the multiple charging stations 6. However, the number of the second switching elements 22 can be reduced by reducing the combinations of connection circuits.

The rated voltages of the multiple second switching elements 22 that are used can be less than the rated voltages of the multiple first switching elements 21. In other words, the rated voltages of the multiple second switching elements 22 may be less than the rated voltages of the corresponding power supplies 4 among the multiple power supplies 4. The rated currents of the multiple second switching elements 22 are not less than the rated currents of the corresponding power supplies 4 among the multiple power supplies 4. The multiple second switching elements 22 are, for example, relays for low-voltage/large-current switching. However, the multiple second switching elements 22 are not limited to relays and may be any switching element that can withstand the rated currents of the corresponding power supplies 4 and has a withstand voltage less than the rated voltages of the corresponding power supplies 4.

For example, when the maximum charging voltage/current of the power storage device of the electric vehicle is 400 V/100 A, it is necessary for the rated currents of the multiple first switching elements 21 and the multiple second switching elements 22 to be not less than DC 100 A. It is necessary for the rated voltages of the multiple first switching elements 21 to be not less than DC 400 V. The rated voltages of the multiple second switching elements 22 may be equal to or less than DC 30 V. Thus, the rated voltages of the multiple second switching elements 22 can be, for example, drastically reduced compared to the rated voltages of the multiple first switching elements 21.

However, the current-voltage performance of the multiple first switching elements 21 and the multiple second switching elements 22 is not limited to that described above. It is sufficient for the current-voltage performance of the multiple first switching elements 21 and the multiple second switching elements 22 to be appropriately determined according to the total voltage of the power storage device of the electric vehicle, the rated output of the multiple power supplies 4, etc. It is substantially unnecessary to consider the circuit voltage for the rated voltages of the multiple second switching elements 22; and the components can be selected only to withstand the rated currents of the corresponding power supplies 4.

The multiple second switching elements 22 each include a pair of contacts 22*p* and 22*n* that includes the contact 22*p* opening and closing the high-potential (+) side path and the contact 22*n* opening and closing the low-potential (−) side path among the DC power supply paths between the corresponding power supplies 4 and the corresponding charging stations 6.

On the other hand, the multiple first switching elements 21 include only one contact that opens and closes the high-potential (+) side path.

Figure 2A:
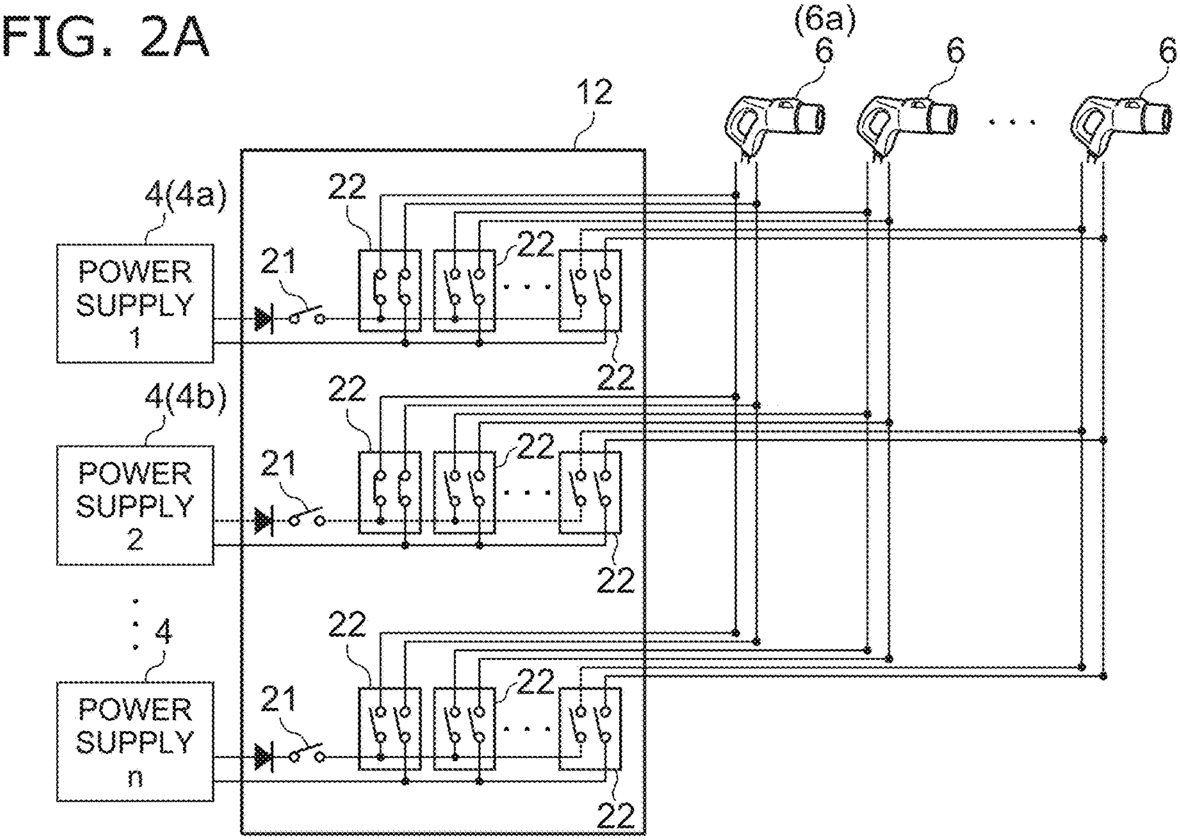
FIGS. 2A and 2B are explanatory drawings schematically illustrating an example of an operation of the switching device according to the embodiment.
Figure 2B:
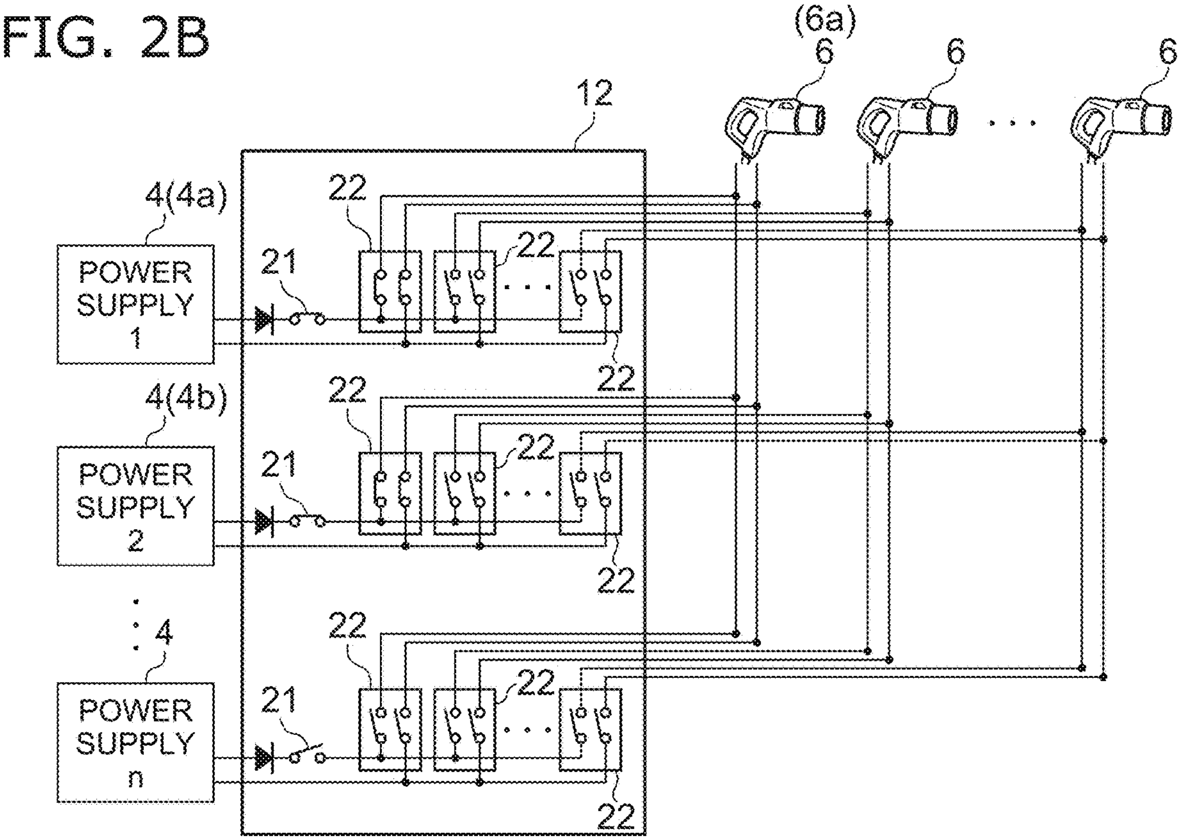

FIGS. 2A and 2B are explanatory drawings schematically illustrating an example of an operation of the switching device according to the embodiment.

FIGS. 2A and 2B schematically illustrate an example of an operation of the switching device 10 when power is supplied from two power supplies 4*a* and 4*b* among the multiple power supplies 4 to one charging station 6*a* among the multiple charging stations 6. A portion of the switching device 10 is not illustrated for convenience in FIGS. 2A and 2B.

In the state in which none of the multiple charging stations 6 are supplying power, the controller 14 of the switching device 10 sets the multiple first switching elements 21 and each of the multiple second switching elements 22 to the open state as illustrated in FIG. 1.

When supplying power from the power supplies 4*a* and 4*b* to the charging station 6*a*, first, as illustrated in FIG. 2A, the controller 14 switches the second switching element 22 located between the power supply 4*a* and the charging station 6*a* and the second switching element 22 located between the power supply 4*b* and the charging station 6*a* from the open state to the engaged state. More specifically, the controller 14 switches the pair of contacts 22*p* and 22*n* of the second switching element 22 located between the power supply 4*a* and the charging station 6*a* and the pair of contacts 22*p* and 22*n* of the second switching element 22 located between the power supply 4*b* and the charging station 6*a* from the open state to the engaged state.

Subsequently, as illustrated in FIG. 2B, the controller 14 switches the first switching element 21 located between the power supply 4*a* and the charging station 6*a* and the first switching element 21 located between the power supply 4*b* and the charging station 6*a* from the open state to the engaged state.

Thereby, the power supply 4*a* is connected with the charging station 6*a* via the first switching element 21 and the second switching element 22; the power supply 4*b* is connected with the charging station 6*a* via the first switching element 21 and the second switching element 22; and DC power can be supplied from the power supplies 4*a* and 4*b* to the charging station 6*a*.

When stopping the supply of power from the power supplies 4*a* and 4*b* to the charging station 6*a*, the controller 14 switches the first switching element 21 located between the power supply 4*a* and the charging station 6*a* and the first switching element 21 located between the power supply 4*b* and the charging station 6*a* from the engaged state to the open state. In other words, the controller 14 returns the state from the state illustrated in FIG. 2B to the state illustrated in FIG. 2A.

Subsequently, the controller 14 switches the second switching element 22 located between the power supply 4*a* and the charging station 6*a* and the second switching element 22 located between the power supply 4*b* and the charging station 6*a* from the engaged state to the open state. More specifically, the controller 14 switches the pair of contacts 22*p* and 22*n* of the second switching element 22 located between the power supply 4*a* and the charging station 6*a* and the pair of contacts 22*p* and 22*n* of the second switching element 22 located between the power supply 4*b* and the charging station 6*a* from the engaged state to the open state. In other words, the controller 14 returns the state illustrated in FIG. 2A to the state illustrated in FIG. 1.

Thereby, the power supply 4*a* is disconnected from the charging station 6*a* by the first and second switching elements 21 and 22; and the power supply 4*b* is disconnected from the charging station 6*a* by the first and second switching elements 21 and 22, which results in the state in which the supply of power from the power supplies 4*a* and 4*b* to the charging station 6*a* is stopped.

There is a configuration of a switching device used in charging equipment in which the multiple first switching elements 21 are not included, and only the multiple second switching elements 22 switch the connections between each of the multiple power supplies 4 and each of the multiple charging stations 6. In such a case, each of the multiple second switching elements 22 must be an element that can withstand high voltages/large currents, which may cause an equipment cost increase of the charging equipment.

In contrast, in the switching device 10 according to the embodiment, the switching part 12 includes the multiple first switching elements 21 and the multiple second switching elements 22. When power is supplied from a designated power supply 4 among the multiple power supplies 4 to a designated charging station 6 among the multiple charging stations 6 as described with reference to FIGS. 2A and 2B, the controller 14 switches the first switching element 21 located between the designated power supply 4 and the designated charging station 6 from the open state to the engaged state after switching the second switching element 22 located between the designated power supply 4 and the designated charging station 6 from the open state to the engaged state. Then, when stopping the supply of power from the designated power supply 4 to the designated charging station 6, the controller 14 switches the second switching element 22 located between the designated power supply 4 and the designated charging station 6 from the engaged state to the open state after switching the first switching element 21 located between the designated power supply 4 and the designated charging station 6 from the engaged state to the open state.

As described above, the undesirable application of the high voltage of the multiple power supplies 4 and/or the power storage devices of the electric vehicles to the two ends of each of the multiple second switching elements 22 can be suppressed by providing the multiple first switching elements 21 and the multiple second switching elements 22 and by controlling the switching of the multiple first switching elements 21 and the multiple second switching elements 22.

In the switching device 10 according to the embodiment, the high voltage of the multiple power supplies 4 and/or the power storage devices of the electric vehicles are applied only to the two ends of each of the multiple first switching elements 21. Accordingly, in the switching device 10, it is sufficient to use high-voltage/large-current elements for only the multiple first switching elements 21; and inexpensive low-voltage/large-current elements can be used for the multiple second switching elements 22.

The number of the multiple second switching elements 22 is more than the number of the multiple first switching elements 21 due to the number of the multiple first switching elements 21 being multiplied by the number of the multiple charging stations 6. On the other hand, for example, the cost of the second switching element 22 can be reduced to be not more than about 1/10 of the cost of the first switching element 21. Therefore, compared to a configuration in which only the multiple second switching elements 22 perform the switching, a cost increase of the entire switching device 10 can be suppressed even when the number of components is increased due to the multiple first switching elements 21. For example, the suppression effect of the equipment cost increase can be increased as the number of the charging stations 6 in the switching device 10 increases.

According to the embodiment as described above, the switching device 10 for the charging equipment that appropriately switches the output destinations while suppressing an equipment cost increase can be provided.

Also, in the charging equipment 2, it is desirable for the power supplies 4 not supplying power to the charging stations 6 to be completely disconnected from the charging stations 6.

In the switching device 10, the multiple second switching elements 22 include the pair of contacts 22*p* and 22*n* that includes the contact 22*p* opening and closing the high-potential (+) side path and the contact 22*n* opening and closing the low-potential (−) side path among the DC power supply paths between the corresponding power supplies 4 and the corresponding charging stations 6; and the multiple first switching elements 21 open and close only the high-potential (+) side path among the DC power supply paths between the corresponding power supplies 4 and the multiple charging stations 6.

Accordingly, the power supplies 4 that are not supplying power to the charging stations 6 can be appropriately disconnected from the charging stations 6 by the multiple second switching elements 22; the number of contacts of the expensive multiple first switching elements 21 can be suppressed; and an equipment cost increase can be more appropriately suppressed.

The configurations of the multiple first switching elements 21 and the multiple second switching elements 22 are not limited to those described above. The multiple first switching elements 21 may include a pair of contacts that includes a contact opening and closing the high-potential (+) side path and a contact opening and closing the low-potential (−) side path among the DC power supply paths between the corresponding power supplies 4 and the multiple charging stations 6.

The configurations of the multiple first switching elements 21 and the configurations of the multiple second switching elements 22 may be any configuration that can appropriately switch the connections between each of the multiple power supplies 4 and each of the multiple charging stations 6.

Although several embodiments of the invention are described, these embodiments are presented as examples and are not intended to limit the scope of the invention. These novel embodiments may be carried out in other various forms; and various omissions, substitutions, and modifications can be performed without departing from the spirit of the invention. Such embodiments and their modifications are within the scope and spirit of the invention and are included in the invention described in the claims and their equivalents.

| [Reference Signs List] |
| --- |
| 2 charging equipment, 4 power supply, 6 charging station, 10 switching device, 12 switching part, 14 controller, 21 first switching element, 22 second switching element |

The invention claimed is:

1. A switching device for charging equipment, the switching device being used in the charging equipment, the charging equipment including:

a plurality of power supplies configured to supply direct current power corresponding to electric vehicles; and a plurality of charging stations used to connect with the electric vehicles, the switching device selectively switching connections between each of the plurality of power supplies and each of the plurality of charging stations, the switching device comprising:

a switching part switching the connections between each of the plurality of power supplies and each of the plurality of charging stations; and a controller controlling the switching of the connections by the switching part, the switching part including:

a plurality of first switching elements provided to correspond respectively to the plurality of power supplies; and a plurality of second switching elements located between each of the plurality of first switching elements and each of the plurality of charging stations, the plurality of second switching elements allowing direct current power supplied from the plurality of power supplies to be selectively supplied via the plurality of first switching elements to each of the plurality of charging stations, rated voltages of the plurality of first switching elements being respectively not less than rated voltages of corresponding power supplies among the plurality of power supplies, rated currents of the plurality of first switching elements being respectively not less than rated currents of the corresponding power supplies, rated voltages of the plurality of second switching elements being less than the rated voltages of the plurality of first switching elements, rated currents of the plurality of second switching elements being not less than the rated currents of the corresponding power supplies, the controller controlling the switching of the connections by the switching part by controlling switching of each of the plurality of first switching elements and the plurality of second switching elements, so that when supplying power from a designated power supply among the plurality of power supplies to a designated charging station among the plurality of charging stations, the first switching element located between the designated power supply and the designated charging station is switched from an open state to an engaged state after the second switching element located between the designated power supply and the designated charging station is switched from an open state to an engaged state.

2. The switching device for the charging equipment according to claim 1, wherein when stopping the supply of power from the designated power supply to the designated charging station, the controller switches the second switching element located between the designated power supply and the designated charging station from the engaged state to the open state after switching the first switching element located between the designated power supply and the designated charging station from the engaged state to the open state.

3. The switching device for the charging equipment according to claim 1, wherein direct current power supply paths between the plurality of power supplies and the plurality of charging stations include high-potential-side paths and low-potential-side paths, each of the plurality of second switching elements includes a pair of contacts including:

a contact opening and closing the high-potential-side path; and a contact opening and closing the low-potential-side path, and each of the plurality of first switching elements opens and closes only the high-potential-side path.

* * * * *